(12) United States Patent
Kim et al.

(10) Patent No.: US 6,724,242 B2
(45) Date of Patent: Apr. 20, 2004

(54) PUMP CIRCUITS AND METHODS FOR INTEGRATED CIRCUITS INCLUDING FIRST AND SECOND OSCILLATORS AND FIRST AND SECOND PUMPS

(75) Inventors: Hyung-Dong Kim, Gyeonggi-do (KR); Chi-Sung Oh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/370,398

(22) Filed: Feb. 20, 2003

(65) Prior Publication Data

US 2003/0227321 A1 Dec. 11, 2003

(30) Foreign Application Priority Data

Jun. 7, 2002 (KR) ................ 10-2002-0031927

(51) Int. Cl.[7] ................................................. G05F 3/02
(52) U.S. Cl. ..................................................... 327/536
(58) Field of Search ................... 327/530, 534, 327/535, 536, 537

(56) References Cited

U.S. PATENT DOCUMENTS

| 5,877,651 | A | * | 3/1999 | Furutani ............ 327/538 |
| 5,920,226 | A | | 7/1999 | Mimura |
| 5,929,694 | A | | 7/1999 | Yanagawa et al. |
| 6,320,457 | B1 | * | 11/2001 | Yang ............ 327/536 |
| 6,429,725 | B1 | | 8/2002 | Tanzawa et al. |

FOREIGN PATENT DOCUMENTS

JP          10-289574 A       7/1999

* cited by examiner

*Primary Examiner*—Jeffrey Zweizig
(74) *Attorney, Agent, or Firm*—Myers Bigel Sibley & Sajovec

(57) ABSTRACT

Boosted voltage generates and methods for an integrated circuit are configured to boost an initial boosted voltage to a first boosted voltage in response to detecting a drop in the initial voltage. The first boosted voltage is then boosted to a second boosted voltage in response to a pulse. The second boosted voltage is then repeatedly boosted to approach the initial boosted voltage in response to an oscillating signal. Accordingly, stable boosted voltages may be generated.

17 Claims, 3 Drawing Sheets

PUMP CIRCUITS AND METHODS FOR INTEGRATED CIRCUITS INCLUDING FIRST AND SECOND OSCILLATORS AND FIRST AND SECOND PUMPS

RELATED APPLICATION

This application claims the benefit of Korean Patent Application No. 2002-0031927, filed Jun. 7, 2002, the disclosure of which is hereby incorporated herein by reference in its entirety as if set forth fully herein.

FIELD OF THE INVENTION

This invention relates to integrated circuit devices such as integrated circuit memory devices, and more particularly to pump circuits and methods for integrated circuit devices such as integrated circuit memory devices.

BACKGROUND OF THE INVENTION

Integrated circuit devices such as integrated circuit memory devices are widely used for consumer and commercial applications. As is well known, an integrated circuit may receive an external power supply voltage, often referred to as a VCC voltage or VCC, for supplying power to the circuits thereof. As is also well known, it often is desirable to generate a boosted voltage, often referred to as a VPP voltage or VPP, internal to the integrated circuit, which is higher than the external power supply voltage. An internal voltage generator, often referred to as a pump circuit or a charge pump circuit, may be used to generate the VPP voltage.

U.S. Pat. No. 5,929,694 to Yanagawa et al. entitled Semiconductor Device Having Voltage Generation Circuit, describes a semiconductor device that operates in one of at least two different modes including a first mode and a second mode. The semiconductor device includes a first voltage generating circuit operating in the first mode and the second mode and having a power to supply a first amount of current in order to generate a predetermined voltage level, and a second voltage generating circuit operating only in the second mode and having a power to supply a second amount of current greater than the first amount of current in order to generate the predetermined voltage level, wherein the first voltage generating circuit increases the first amount of current in the second mode compared to in the first mode. See the Yanagawa et al. abstract. Also see the corresponding Japanese Patent No. 10-289574.

U.S. Pat. No. 5,920,226 to Mimura entitled Internal Voltage Generator With Reduced Power Consumption, describes an internal voltage generator wherein a first periodic pulse is rectified to generate an internal voltage by a charge pump circuit. A level detector is provided for detecting whether or not the internal voltage reaches a desired level. The charge pump circuit is controlled by a controller in accordance with the detection signal so that the internal voltage may take the desired level. A switch element switched by a second periodic pulse is provided in the current path of the level detector. A leakage current path for allowing a lower electric current than the electric current to flow through the former current path is provided between the output terminal of the charge pump circuit and a predetermined power supply terminal. See the Mimura abstract.

U.S. Pat. No. 6,429,725 to Tanzawa et al. entitled Pump Circuit With Active-Mode and Stand-By Mode Booster Circuits, describes a standby-mode circuit that is activated in both a standby mode and an active mode and boosts up a power supply voltage to generate a booster voltage and output it from an output terminal. An active-mode booster circuit is activated in the active mode. In the active-mode booster circuit, an NMOS transistor is first turned on in response to a reset signal supplied from a reset signal generation circuit and then a connection node of capacitors is reset to the power supply voltage by the NMOS transistor. The boost operation is then started to output the booster voltage from the output terminal. See the Tanzawa et al. abstract.

SUMMARY OF THE INVENTION

Some embodiments of the present invention provide boosted voltage generators and methods for an integrated circuit that are configured to boost an initial boosted voltage to a first boosted voltage in response to detecting a drop in the initial voltage. The first boosted voltage is then boosted to a second boosted voltage in response to a pulse. The second boosted voltage is then repeatedly boosted to approach the initial boosted voltage in response to an oscillating signal. Accordingly, stable boosted voltages may be generated.

Other embodiments of the invention provide circuits and methods for generating a boosted voltage for an integrated circuit, which generate a first oscillating signal, generate a second oscillating signal in response to an active pump signal, generate a high voltage pump signal in response to the first and second oscillating signals, generate a first boosted voltage in response to the high voltage pump signal, generate a second boosted voltage in response to the active pump signal, and combine the first and second boosted voltages. In some embodiments, a pulse also is generated in response to the active pump signal, and the first boosted voltage also is generated in response to the pulse.

Other embodiments of the present invention provide pump circuits and methods for an integrated circuit that include a standby mode voltage detector that is configured to detect a high voltage in a standby mode, to generate a standby mode voltage signal. An active mode voltage detector is configured to detect the high voltage in an active mode, to generate an active mode voltage signal. An active pump signal generator is configured to generate an active pump signal in response to the active mode voltage signal and an active mode signal. A first oscillator is enabled in response to the standby mode voltage signal. A second oscillator is enabled in response to the active pump signal. A high voltage pump signal generator is configured to receive an output of the first oscillator and an output of the second oscillator, and to generate a high voltage pump signal in response to the active mode signal. A high voltage pulse signal generator is configured to generate a high voltage pulse signal in response to the active pump signal. A first pump is configured to generate the high voltage in response to the high voltage pump signal and the high voltage pulse signal. A second pump is configured to generate the high voltage in response to the active pump signal. In some embodiments, the first oscillator is enabled in response to the standby mode voltage signal, and the second oscillator is enabled in response to the active pump signal.

DETAILED DESCRIPTION OF PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. Each embodiment described and illustrated herein includes its complementary conductivity type embodiment as well.

Figure 1:
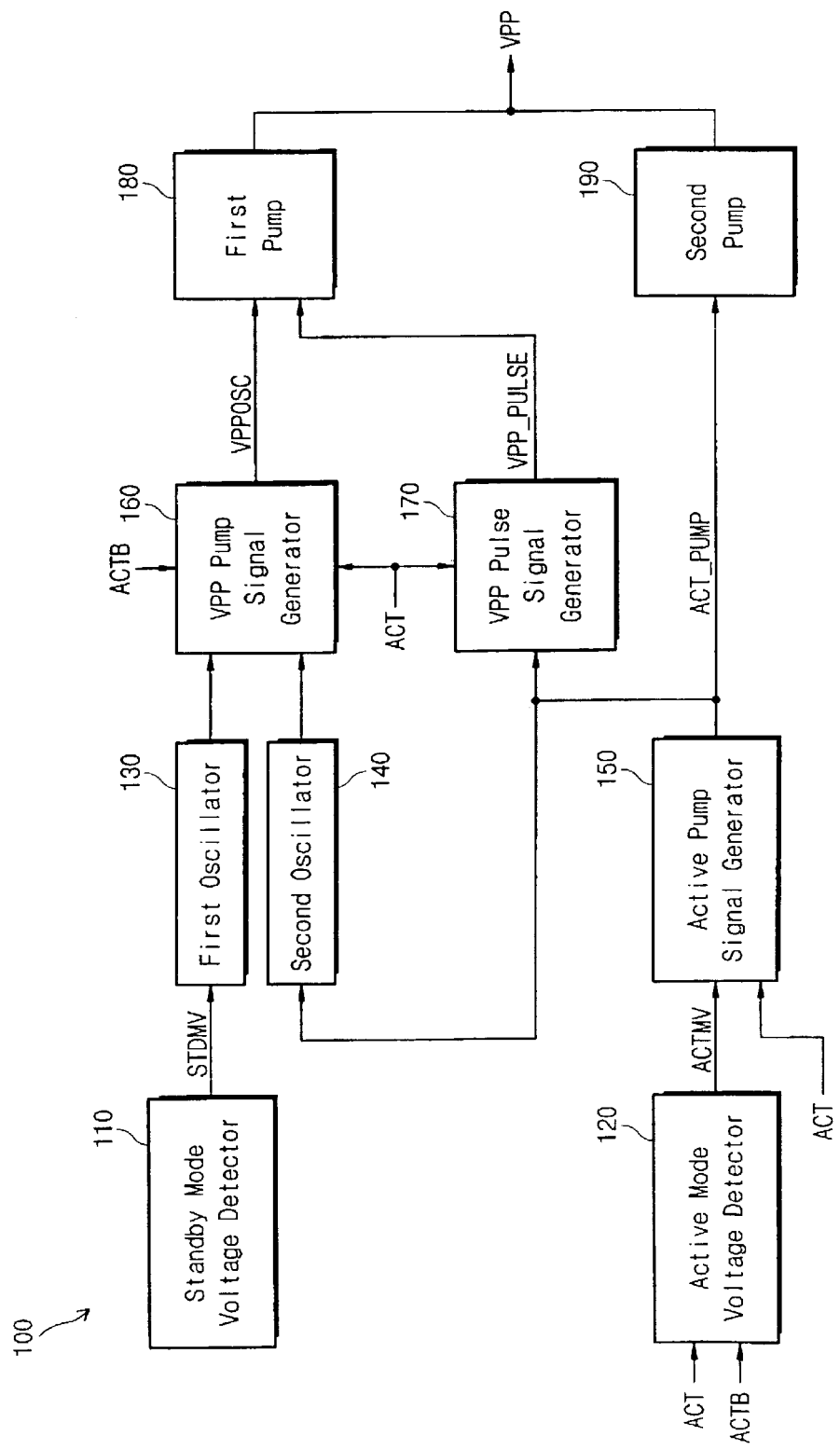
FIG. 1 is a block diagram of a pump circuit in accordance with embodiments of the present invention.

FIG. 1 is a block diagram of a pump circuit 100 in accordance with embodiments of the present invention. Referring to FIG. 1, the pump circuit 100 includes a standby mode voltage detector 110, an active mode voltage detector 120, a first oscillator 130, a second oscillator 140, an active pump signal generator 150, a VPP pump signal generator 160, a VPP pulse signal generator 170, a first pump 180, and a second pump 190.

The standby mode voltage detector 110 detects a VPP voltage in the standby mode to generate a standby mode voltage signal STDMV, and the active mode voltage detector 120 detects the VPP voltage at the active mode to generate an active mode voltage signal ACTMV. The first oscillator 130 is enabled in response to the standby mode voltage signal STDMV, and the second oscillator 140 is enabled in response to an output of the active pump signal generator 150. The active pump signal generator 150 generates an active pump signal ACT_PUMP in response to the active mode voltage signal ACTMV and an active mode signal ACT. The VPP pump signal generator 160 receives outputs of the first and second oscillators 130 and 140 to generate a VPP pump signal VPPOSC in response to the active mode signal ACT and an inverted active mode signal ACTB. The VPP pulse signal generator 170 generates a VPP pulse signal VPP_PULSE in response to the active mode signal ACT and the active pump signal ACT_PUMP. The first pump 180 starts to generate the VPP voltage in response to the VPP pulse signal VPP_PULSE and performs a charge pumping operation in response to the VPP pump signal VPPOSC to generate the VPP voltage. The second pump 190 performs a charge pumping operation in response to the active pump signal ACT_PUMP to generate the VPP voltage.

Figure 2:
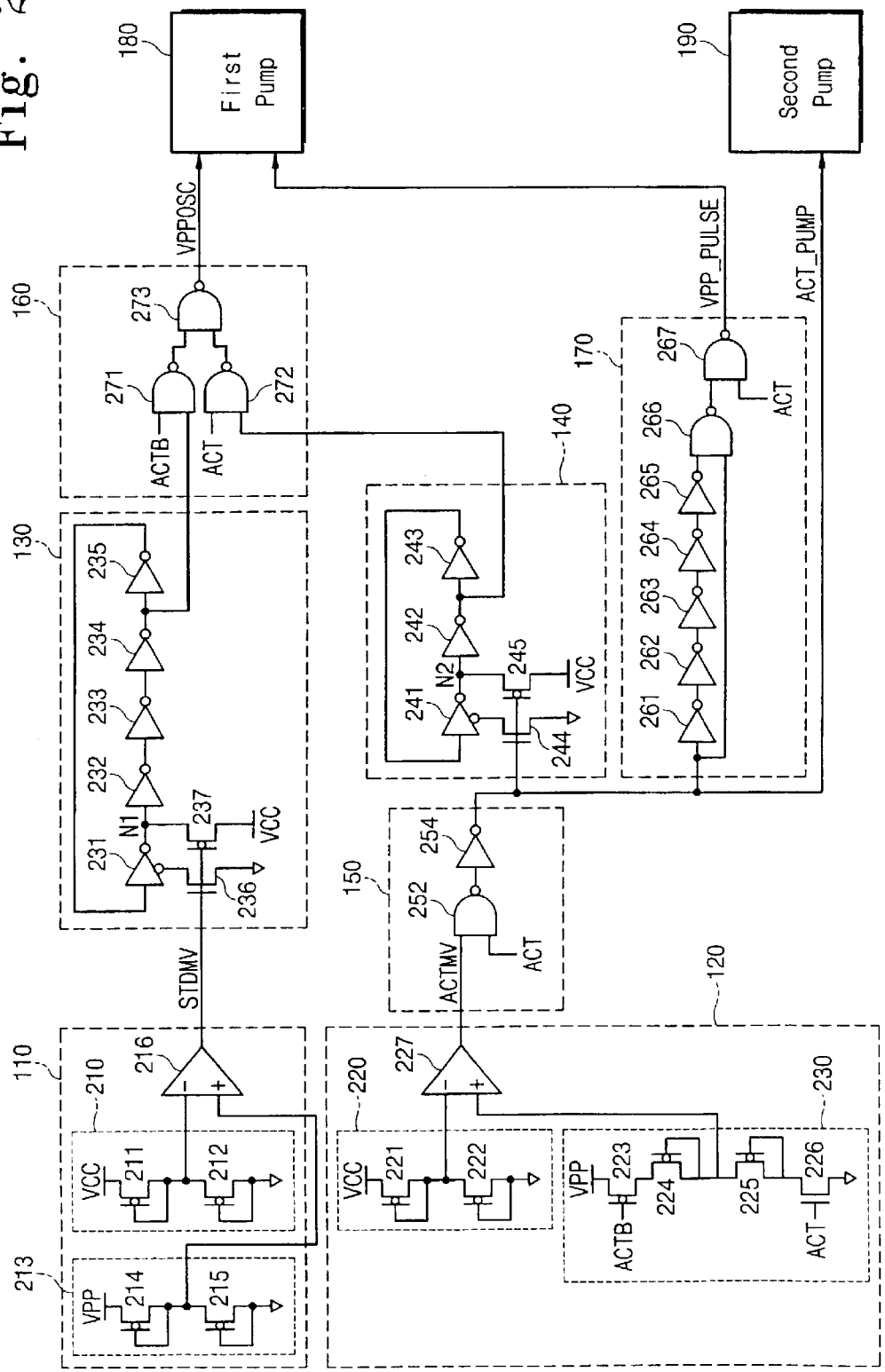
FIG. 2 is a circuit diagram of a pump circuit shown in FIG. 1.

FIG. 2 is a circuit diagram of a pump circuit shown in FIG. 1. Referring to FIG. 2, the standby mode voltage detector 110 for detecting the VPP voltage in the standby mode to generate the standby mode voltage signal STDMV includes a first voltage divider 210, a second voltage divider 213 and a first comparator 216. The first voltage divider 210 divides a VCC voltage into a first voltage level, and includes diode-connected first and second PMOS transistors 211 and 212 connected in series between a VCC voltage and a ground voltage. The second voltage divider 213 divides the VPP voltage into a second voltage level, and includes diode-connected third and fourth PMOS transistors 214 and 215 connected in series between the VCC voltage and the ground voltage. The first comparator 216 compares an output of the first voltage divider 210 and an output of the second voltage divider 213 to generate the standby mode voltage signal STDMV.

In some embodiments, the first voltage divider 210 has the same output voltage level as the second voltage divider 213.

Thus, if the VPP voltage is low, the output of the second voltage divider 213 becomes lower than that of the first voltage divider 210, and the output of the first comparator 216, i.e., the standby mode voltage signal STDMV, becomes a logic high level, so that the first oscillator 130 is enabled. The output of the first oscillator 130 is provided to the VPP pump signal generator 160, which will be described later, to thereby generate the VPP voltage. If the VPP voltage is high, the output of the second voltage divider 213 becomes higher than that of the first voltage divider 210 and the standby mode voltage signal STDMV becomes a logic low level, so that the first oscillator 130 is disabled.

The active mode voltage detector 120 for detecting the VPP voltage in the active mode to generate the active mode voltage signal ACTMV includes a third voltage divider 220, a fourth voltage divider 230, and a second comparator 227. The third voltage divider 220 divides the VCC voltage into two equal voltages and includes diode-connected fifth and sixth PMOS transistors 221 and 222 connected in series between the VCC voltage and the ground voltage. The fourth voltage divider 230 includes seventh to ninth PMOS transistors 223, 224 and 225 and a first NMOS transistor 226, which are connected in series between the VPP voltage and the ground voltage. The seventh PMOS transistor 223 has a gate receiving the inverted active mode signal ACTB, and the first NMOS transistor 226 has a gate receiving the active mode signal ACT. The eighth and ninth PMOS transistors 224 and 225 are diode-connected.

The second comparator 227 compares an output of the third voltage divider 220 (the third voltage level) with that of the fourth voltage divider 230 (the fourth voltage level). In the standby mode, the active mode signal ACT and the inverted active mode signal ACTB are a logic low level and a logic high level, respectively, so that the output of the fourth voltage divider 230 is set to a high impedance. Meanwhile, in the active mode, the active mode signal ACT and the inverted active mode signal ACTB are a logic high level and a logic low level, respectively, so that the fourth voltage divider 230 divides the VPP voltage to the fourth voltage level. If the output of the fourth voltage divider 230 is lower than that of the third voltage divider 220, the second comparator 227 outputs the active mode voltage signal ACTMV of a logic high level. The active mode voltage signal ACTMV of the logic high level enables the second oscillator 140 and the second pump 190, and is output via the VPP pulse signal generator 170 as the VPP pulse signal VPP_PULSE. If the output of the fourth voltage divider 230 is higher than that of the third voltage divider 220, the second comparator 227 outputs the active mode voltage signal ACTMV of a logic low level, thereby disabling the second oscillator 140, the second pump 190 and the VPP pulse signal generator 170.

The first oscillator 130 is provided with an inverter chain having a plurality of inverters 231 to 235 and has an oscillation period of about 60 ns in some embodiments. The first inverter 231 is enabled in response to the standby mode voltage signal STDMV or when an output of the first inverter 231 is set to a logic high level. If the first inverter 231 is enabled, the first oscillator 130 is enabled. If the output of the first inverter is set to the logic high level, the first oscillator 130 is disabled.

The second oscillator 140 is provided with an inverter chain having a plurality of inverters 241 to 243 and has an oscillation period of about 40 ns in some embodiments. The first inverter 241 is enabled in response to the active pump signal ACT_PUMP or an output of the first inverter 241 is set to a logic high level. If the first inverter 241 is enabled, the second oscillator 140 is enabled. If the output of the first inverter 241 is set to the logic high level, the second oscillator 140 is disabled.

The active pump signal generator 150 includes a NAND gate 252 receiving the active mode voltage signal ACTMV and the active mode signal ACT, and an inverter 254 for inverting an output of the NAND gate 252. In the active mode, the active pump signal generator 150 generates the active pump signal ACT_PUMP in response to the active mode voltage signal ACTMV received when the active mode signal ACT is a logic high level. Since the active mode signal ACT is a logic low level in the standby mode, the active mode pump signal ACT_PUMP of a logic low level is generated to thereby disable the second oscillator 140 and the second pump 190. Further, the VPP pulse signal generator 170 generates the VPP pulse signal VPP_PULSE of a low level.

The VPP pump signal generator 160 includes a first NAND gate 271 receiving the output of the first oscillator 130 and the inverted active mode signal ACTB, a second NAND gate 272 receiving the output of the second oscillator 140 and the active mode signal ACT, and a third NAND gate 273 receiving outputs of the first and second NAND gates 271 and 272 and outputting the VPP pump signal VPPOSC. In the standby mode, the VPP pump signal generator 160 generates the VPP pump signal VPPOSC in response to the output of the first oscillator 130 received when the inverted active mode signal ACTB is a logic high level. The first pump 180 performs a charge pumping operation in response to the VPP pump signal VPPOSC to generate the VPP voltage.

The VPP pulse signal generator 170 includes first to fifth inverters 261 to 265 connected in series with each other to receive the active pump signal ACT_PUMP, a first NAND gate 266 receiving an output of the fifth inverter 265 and the active pump signal ACT_PUMP, and a second NAND gate 267 receiving an output of the first NAND gate 266 and the active mode signal ACT and outputting the VPP pulse signal VPP_PULSE. In the active mode, the VPP pulse signal generator 170 generates the VPP pulse signal VPP_PULSE in a form of a high level pulse in response to the active pump signal ACT_PUMP. The VPP pulse signal VPP_PULSE of the logic high level is provided to the first pump 180 and allows the first pump 180 to generate the VPP voltage before the output of the VPP pump signal generator 160 is set.

The first and second pumps 180 and 190 may be embodied using conventional circuits which perform the charge pumping operations to boost the VPP voltage to a predetermined voltage level. Accordingly, they need not be described in detail herein.

Figure 3:
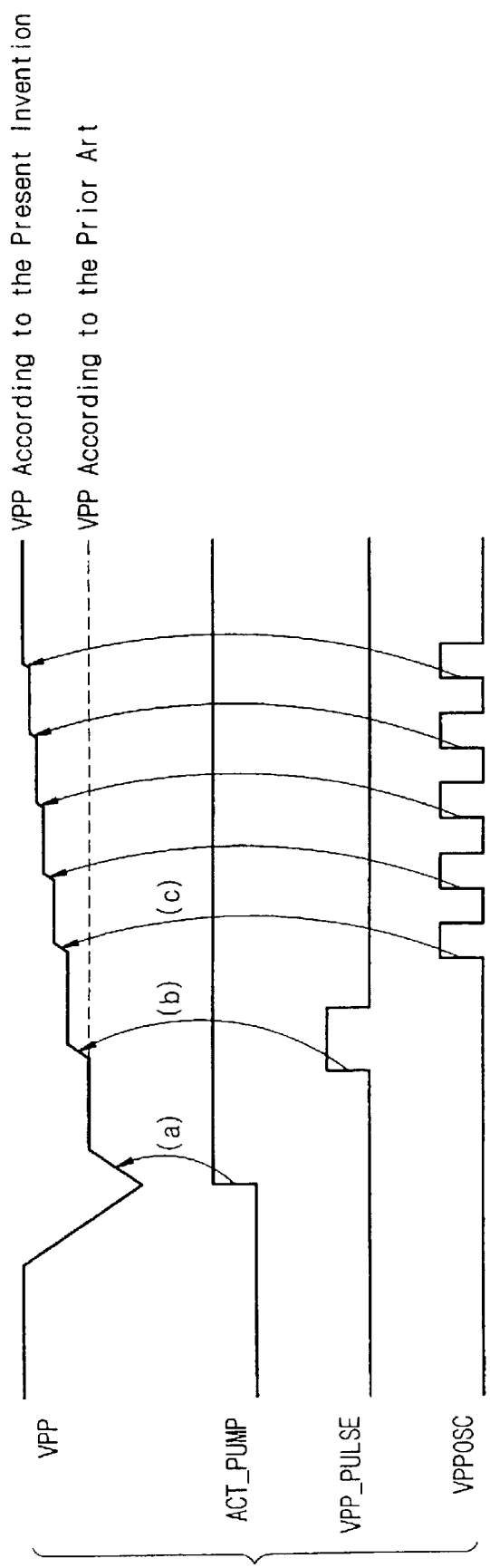
FIG. 3 is a waveform of a pump voltage that is generated according to embodiments of the present invention.

FIG. 3 is a waveform diagram of a VPP voltage that can be generated in accordance with embodiments of the present invention, for example using embodiments of FIGS. 1 and 2. Referring to FIG. 3, a VPP voltage level lowered in the active mode is increased by the second pump 190 driven in response to the active pump signal ACT_PUMP as shown at (a). Then, the first pump 180 is driven in response to the VPP pulse signal VPP_PULSE to thereby increase the VPP voltage level as shown at (b), and the VPP voltage is fully or almost fully compensated via the first pump 180 driven in response to the VPP pump signal VPPOSC as shown at (c).

Accordingly, boosting circuits and/or methods according to some embodiments of the present invention generate the VPP voltage by enabling the first oscillator 130 in the standby mode to perform the charge pumping operation according to the oscillation period of 60 ns. Further, the VPP voltage generation circuit 100 generates the VPP voltage by enabling the second oscillator 140 in the active mode to perform the charge pumping operation according to the oscillation period of 40 ns. Furthermore, since the first pump 180 is driven before the second oscillator 140 is set in response to the VPP pulse signal VPP_PULSE, the lowered VPP voltage level can be rapidly increased. Accordingly, since the charge pumping period in the active mode can be shorter than in the standby mode and the VPP voltage level can be rapidly increased, the VPP voltage can be stably generated.

Thus, in some embodiments, as shown in FIG. 3, an initial boosted voltage is boosted to a first boosted voltage at (a), in response to detecting a drop in the initial boosted voltage. Then, the first boosted voltage is boosted to a second boosted voltage at (b), in response to a pulse VPP_PULSE. Finally, the second boosted voltage is repeatedly boosted at (c), to approach the initial boosted voltage in response to an oscillating signal VPPOSC.

As described above, in some embodiments of the present invention, the charge pumping period in the standby mode is different from that in the active mode. In some embodiments, since the charge pumping period in the active mode is smaller and the VPP voltage level is rapidly increased, the VPP voltage can be stably generated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A pump circuit for an integrated circuit comprising:
   a standby mode voltage detector that is configured to detect a high voltage in a standby mode to generate a standby mode voltage signal;
   an active mode voltage detector that is configured to detect the high voltage in an active mode to generate an active mode voltage signal;
   an active pump signal generator that is configured to generate an active pump signal in response to the active mode voltage signal and an active mode signal;
   a first oscillator that is enabled in response to the standby mode voltage signal;
   a second oscillator that is enabled in response to the active pump signal;
   a high voltage pump signal generator that is configured to receive an output of the first oscillator and an output of the second oscillator and to generate a high voltage pump signal in response to the active mode signal;
   a high voltage pulse signal generator that is configured to generate a high voltage pulse signal in response to the active pump signal;
   a first pump that is configured to generate the high voltage in response to the high voltage pump signal and the high voltage pulse signal; and
   a second pump that is configured to generate the high voltage in response to the active pump signal.

2. The pump circuit for an integrated circuit of claim 1, wherein the standby mode voltage detector comprises:
   a first voltage divider that is configured to divide a power supply voltage into a first voltage level;
   a second voltage divider that is configured to divide the high voltage into a second voltage level; and
   a comparator that is configured to compare the first and second voltage levels to generate the standby mode voltage signal.

3. The pump circuit for an integrated circuit of claim 1, wherein the active mode voltage detector comprises:
   a third voltage divider that is configured to divide a power supply voltage into a third voltage level;
   a fourth voltage divider that is configured to divide the high voltage into a fourth voltage level in response to the active mode signal and an inverted active mode signal; and
   a comparator that is configured to compare the third and fourth voltage levels to generate the active mode voltage signal.

4. The pump circuit for an integrated circuit of claim 1, wherein the first oscillator is enabled in response to the standby mode voltage signal.

5. The pump circuit for an integrated circuit of claim 1, wherein the second oscillator is enabled in response to the active pump signal.

6. The pump circuit for an integrated circuit of claim 1, wherein the high voltage pulse signal generator comprises:
   an inverter chain having an odd number of inverters connected in series to each other and receiving the active pump signal;
   a first NAND gate that is configured to receive an output of the inverter chain and the active pump signal; and
   a second NAND gate that is configured to receive the active mode signal and an output of the first NAND gate to generate the high voltage pulse signal.

7. The high voltage generation circuit of claim 1, wherein the second oscillator has an oscillation period shorter than the first oscillator.

8. A method for generating a boosted voltage for an integrated circuit, the method comprising:
   detecting a high voltage in a standby mode to generate a standby mode voltage signal;
   detecting the high voltage in an active mode to generate an active mode voltage signal;
   generating an active pump signal in response to the active mode voltage signal and an active mode signal;
   generating a first oscillation signal in response to the standby mode voltage signal, the first oscillation signal having a first oscillation period;
   generating a second oscillation signal in response to the active pump signal, the second oscillation signal having a second oscillation period;
   generating a high voltage pump signal in response to the first and second oscillation signals;
   generating a high voltage pulse in response to the active pump signal; and
   performing a charge pumping operation in response to the high voltage pump signal, the high voltage pulse and the active pump signal to generate the high voltage.

9. The method of claim 8, wherein the second oscillation period of the second oscillation signal is shorter than the first oscillation period of the oscillation signal.

10. A pump circuit for an integrated circuit comprising:
    a first oscillator;
    a second oscillator that is responsive to an active pump signal;
    a pump signal generator that is responsive to the first and second oscillators;
    a first pump that is responsive to the pump signal generator; and
    a second pump that is responsive to the active pump signal, wherein outputs of the first and second pumps are combined to provide a boosted voltage for the integrated circuit.

11. A pump circuit according to claim 10 further comprising:
    a pulse generator that is configured to generate a pulse in response to the active pump signal, wherein the first pump also is responsive to the pulse.

12. A method for generating a boosted voltage for an integrated circuit comprising:
    generating a first oscillating signal;
    generating a second oscillating signal in response to an active pump signal;
    generating a high voltage pump signal in response to the first and second oscillating signals;
    generating a first boosted voltage in response to the high voltage pump signal;
    generating a second boosted voltage in response to the active pump signal; and
    combining the first and second boosted voltages.

13. A method according to claim 12 further comprising:
    generating a pulse in response to the active pump signal, wherein the first boosted voltage also is generated in response to the pulse.

14. A boosted voltage generator for an integrated circuit comprising:
    a first circuit that is configured to boost an initial boosted voltage to a first boosted voltage in response to detecting a drop in the initial boosted voltage;
    a second circuit that is configured to boost the first boosted voltage to a second boosted voltage in response to a pulse; and
    a third circuit that is configured to repeatedly boost the second boosted voltage to approach the initial boosted voltage in response to an oscillating signal.

15. A boosted voltage generator according to claim 14 wherein the first circuit is responsive to entry of the integrated circuit into an active mode from a standby mode.

16. A method for generating a boosted voltage for an integrated circuit comprising:
    boosting an initial boosted voltage to a first boosted voltage in response to detecting a drop in the initial boosted voltage; then
    boosting the first boosted voltage to a second boosted voltage in response to a pulse; and then
    repeatedly boosting the second boosted voltage to approach the initial boosted voltage in response to an oscillating signal.

17. A method according to claim 16 wherein the boosting the initial boosted voltage is performed in response to entry of the integrated circuit into an active mode from a standby mode.

* * * * *